United States Patent [19]
Kawakami et al.

[11] Patent Number: 5,376,437
[45] Date of Patent: Dec. 27, 1994

[54] LAMINATED THREE-LAYER FILM

[75] Inventors: Kenichi Kawakami, Abiko; Katsuhiro Tsuchiya, Kusatsu; Katsuya Ogawa, Otsu, all of Japan

[73] Assignee: Toray Industries, Inc., Japan

[21] Appl. No.: 39,263

[22] PCT Filed: Aug. 20, 1991

[86] PCT No.: PCT/JP91/01107
§ 371 Date: Apr. 16, 1993
§ 102(e) Date: Apr. 16, 1993

[87] PCT Pub. No.: WO93/03923
PCT Pub. Date: Mar. 4, 1993

[51] Int. Cl.$^5$ ............................................. B32B 27/00
[52] U.S. Cl. ................................... 428/216; 428/349; 428/516; 428/910
[58] Field of Search ................ 428/349, 516, 216, 910

[56] References Cited

U.S. PATENT DOCUMENTS

| | | | |
|---|---|---|---|
| 4,726,999 | 2/1988 | Kohyana et al. | 428/349 |
| 4,740,421 | 4/1988 | Suzuki et al. | 428/349 |
| 4,786,533 | 11/1988 | Crass et al. | 428/349 |
| 4,921,749 | 5/1990 | Bossaert | 428/216 |

*Primary Examiner*—Edith Buffalow
*Attorney, Agent, or Firm*—Austin R. Miller

[57] ABSTRACT

A laminated, heat-sealable, three-layer film superior in sealability and difficult to burst even under a reduced pressure when sealed as a bag is provided.

The laminated three-layer film is characterized in that a base layer (A) which is a biaxially oriented film formed of a crystalline polypropylene, a cushion layer (B) which is a film of an olefin polymer lower in melting point than the base layer (A), and a heat-sealing layer (C) which is an olefin polymer film, are laminated in the order of (A)/(B)/(C) and have surface orientation degrees falling under the following ranges, and that when the cushion layer (B) and the heat-sealing layer (C) are of the same composition, the degree of surface orientation of the cushion layer (B) is smaller than that of the heat-sealing layer (C):

$2.0 \leq P_A \leq 15.0$
$0 \leq P_B \leq 3.5$
$2.0 \leq P_C \leq 4.0$ where,
$P_A$: degree of surface orientation of the base layer (A)
$P_B$: degree of surface orientation of the cushion layer (B)
$P_C$: degree of surface orientation of the heat-sealing layer (C)

11 Claims, No Drawings

LAMINATED THREE-LAYER FILM

INDUSTRIAL UTILIZATION FIELD

The present invention relates to a laminated three-layer film and more particularly to a heat-sealable film superior in sealability under a reduced pressure.

PRIOR ART

In conventional laminate films superior in heat-sealability, in the case where a biaxially oriented film (A) of polypropylene is used as a base layer, a heat-sealing layer (C) is laminated to only one side of the base layer (A) to provide a (A)/(C) laminate film, or the heat-sealing layer (C) is laminated to both sides of the base layer (A) to provide a (C)/(A)/(C) laminate film, or different heat-sealing layers (C) and (C') are laminated to both sides of the base layer (A) to provide a (C)/(A)/(C') laminate film. In all of these cases, the base layer and the heat-sealing layer(s) are in contact with each other. (See Japanese Patent Laid Open No. JP53-28685A and Patent Publication No. JP59-26470B.)

OBJECT OF THE INVENTION

Such conventional laminate films superior in heat-sealability have been disadvantageous in that when the atmospheric pressure changes from a normal pressure to a reduced pressure, for example when the films are exposed to the air of a high ground during transport over a mountain, there occurs cleavage at the interface between the base layer (A) and the heat-sealing layer (C) or (C'), which is apt to cause bursting of the bags formed by the films.

It is the object of the present invention to solve such a problem of the prior art and provide a laminated three-layer film superior in heat-sealability and difficult to burst even under a reduced pressure.

SUMMARY OF THE INVENTION

The laminated three-layer film according to the present invention is characterized in that a base layer (A) which is a biaxially oriented film formed of a crystalline polypropylene, a cushion layer (B) which is a film of an olefin polymer lower in melting point than the base layer (A), and a heat-sealing layer (C) which is an olefin polymer film, are laminated together in the order of (A)/(B)/(C), that the three layers are in the following ranges in terms of the degree of surface orientation, and that when the cushion layer (B) and the heat-sealing layer (C) are of the same composition, the degree of surface orientation of the cushion layer (B) is smaller than that of the heat-sealing layer (C):

$2.0 \leq P_A \leq 15.0$
$0 \leq P_B \leq 3.5$
$2.0 \leq P_C \leq 4.0$ where, $P_A$: degree of surface orientation of the base layer (A)
$P_B$: degree of surface orientation of the cushion layer (B)
$P_C$: degree of surface orientation of the heat-sealing layer (C)

PREFERRED EMBODIMENTS OF THE INVENTION

In the base layer (A) of a biaxially oriented film formed of a crystalline polypropylene in the present invention, the polypropylene is preferably a homopolymer (hereinafter referred to simply as "PP"), but it may be a copolymer of propylene and a small amount of another α-olefin. In view of the rigidity and stretchability required for the base layer, it is preferable for the polypropylene to have a melting point not lower than 155° C. and an intrinsic viscosity $[\eta]$ of 1.5 to 2.5 dl/g. The biaxial orientation of the base layer is obtained by a conventional biaxial orienting method. It is optional which of simultaneous biaxial stretching and sequential biaxial stretching is to be adopted, provided it is necessary that the degree of surface orientation $P_A$ should be in the range of 2.0 to 15.0, preferably 2.5 to 13.0.

The surface orientation degrees ($P_A$, $P_B$, $P_C$) are determined at absorbance ratios $d_{841}/d_{890}$ and $d_{841}/d_{810}$ according to Laser Raman microscopy. An in-plane difference in the degree of surface orientation, $\Delta P_A(|P_{TD}-P_{MD}|)$, which is also determined by the same Laser Raman microscopy, is not specially limited if only the degree of surface orientation is within the foregoing range. It is well known that the closer to zero, the better the length-breadth balance of film. But in the case of a film obtained by sequential biaxial stretching, a suitable $\Delta P_A$ value is in the range of 0 to 13, preferably 6 to 12. If $P_A$ is smaller than 2.0, preferably smaller than 2.5, the resulting laminate film will be low in rigidity and difficult to effect packaging, and if it exceeds 15.0, preferably 13.0, the adhesive force of printing ink will be deteriorated.

The cushion layer (B) formed in contact with the base layer (A) in the invention is characterized by being low in the degree of surface orientation $P_B$, which is in the range of 0 to 3.5, preferably not larger than 3.0, more preferably not larger than 2.5. If $P_B$ of the cushion layer (B) exceeds 3.5, the cushioning property between the base layer (A) and the heat-sealing layer (C) will be deteriorated, thus leading to deterioration in the sealability under a reduced pressure. The polymer which constitutes the cushion layer (B) is an olefin polymer having a degree of surface orientation which falls under the foregoing range and having a melting point lower than that of the base layer (A). Preferably, the melting point of the polymer is in the range of 80° to 155° C. Examples are homopolymers of α-olefins (e.g. polyethylene), copolymers of α-olefins (e.g. ethylene-propylene copolymer, ethylene-butene copolymer, ethylene-propylene-butene copolymer), as well as such olefin copolymers as ethylene-vinyl acetate copolymer and ethylene-acryl monomer copolymer. Ethylene copolymers are preferred. Particularly, ethylene-propylene-butene copolymer is preferred.

The cushion layer (B) may be of the same composition as the heat-sealing layer (C). But in this case, it is necessary that the degree of surface orientation of the cushion layer (B) be smaller than that of the heat-sealing layer (C). The difference in the surface orientation degree between the two is preferably not less than 0.5, more preferably not less than 1.0. That the composition is the same means that the polymer constituting monomers are the same.

The cushion layer is a layer which is sandwiched in between the base layer and the heat-sealing layer. When the bag formed by the constituent layers is about to be burst upon sudden expansion under a reduced pressure, the cushion layer absorbs the stress imposed on the base layer (A) and that on the heat-sealing layer (C) to prevent, or make it difficult, the bag from being pulled by the hard base layer and heat-seal layer and burst eventually. Thus, the cushion layer serves as a buffer. That is, it is a layer for affording a cushioning action. It is necessary for the cushion layer to be sandwiched in between the base layer (A) and the heat-sealing layer (C). If it is positioned outside (A)/(C), its cushioning action will be insufficient in practical use.

It is necessary that the heat-sealing layer (C) used in the invention should have a degree of surface orientation $P_C$ of 2.0 to 4.0, preferably 2.5 to 3.5. If $P_C$ is smaller than 2.0, hot tack is apt to occur at the time of sealing, thus resulting in difficulty of processing, and if it exceeds 4.0, a deteriorated heat-sealing force will result. The polymer which constitutes the heat-sealing layer (C) is an olefin homopolymer or an olefin copolymer, with the latter being preferred. Examples are ethylene copolymers such as ethylene-propylene copolymer, ethylene-propylene-butene copolymer, ethylene-butene copolymer, copolymers of ethylene and acryl monomers such as acrylic acid, methyl acrylate, ethyl acrylate, methacrylic acid, methyl methacrylate arid ethyl methacrylate, ethylene-maleic arthydride copolymer, terpolymers of these comohomers with maleic anhydride, and ethylene-vinyl acetate copolymer, as well as mixtures thereof. Such olefin homopolymers as polyethylene and polypropylene are also employable preferably in the form of an extruded laminate or in a laminated form of unstretched films thereof. Further, petroleum resins, wax, etc. may be incorporated in the heat-sealing layer.

In the laminated three-layer film of the present invention it is necessary that the base layer (A), cushion layer (B) and heat-sealing layer (C) be laminated in the order of (A)/(B)/(C). This construction is essential for obtaining a film superior in sealability and also in the bag-burst preventing property under a reduced pressure. Particularly, the layer (B) is a cushion layer whose surface orientation is kept to a minimum, so it is required to be sandwiched in between the base layer (A) and the heat-sealing layer (C).

It is preferable that a fatty acid amide, inorganic particles, fine silicone particles or the like, be incorporated in the range of 0.01 to 5 wt. % into both surface layers, namely the base layer (A) and the heat-sealing layer (C), of the laminated three-layer film, to impart slipperiness and blocking resistance thereto.

In the three-layer film of the invention, the thickness of each layer is not specially limited. But as to the base layer (A), it is preferred that the lower limit of its thickness be 10 μm in view of stiffness and resistance to load and the upper limit thereof be 80 μm in view of an economic amount of polymer used per unit area. Also as to the thickness of the cushion layer (B), there is no limitation placed thereon. But when its cushioning effect is taken into consideration, it is preferred that the lower limit of its thickness be 1 μm from the standpoint of preventing the burst of bag under a reduced pressure and the upper limit thereof be 5 μm from the standpoint of rigidity. Further, no special limitation is imposed on the thickness of the heat-sealing layer (C), either, but it is preferred that the lower limit thereof be 2 μm from the standpoint of sealability and prevention of bag-burst at a reduced pressure and the upper limit thereof be 25 μm from the standpoint of rigidity.

On the base layer (A) side in the present invention, when O/C ratio is in the range of 0.1 to 0.35 and N/C ratio in the range of 0.005 to 0.05, as atomic ratios within 10 nm from the surface, there is attained an excellent printability, namely a strong adhesive force of printing ink, of the said surface, so such ranges are preferred.

The laminating method for the three-layer film is not specially limited. But the method of laminating the layers (A) and (B) by co-extrusion and then forming the heat-sealing layer (C) on the cushion layer (B) by extrusion or coating, can easily afford the specified ranges of surface orientation degrees and is advantageous from the economic point of view. Of course, there may be adopted a method in which the three layers are formed at a time by co-extrusion.

Examples of methods for preparing the laminated three-layer film of the invention will be described below, but it is to be understood that the present invention is not limited thereto.

According to a first manufacturing example, a polypropylene for constituting a base layer (A) is fed to an extruder, while a polymer for constituting a cushion layer (B) is fed to another extruder, then both are conducted to a single die, from which they are co-extruded simultaneously in a melted state at 200°–300° C. and wound onto a cooling drum to obtain a two-layer sheet. Subsequently, the two-layer sheet is conducted to an oven with rolls or a roll disposed therein, in which it is stretched 3 to 7 times in the longitudinal direction under heating to 100°–150° C. Then, the sheet is conducted into a tenter, in which it is heated to 150°–190° C. and stretched 5 to 15 times in the transverse (width) direction, then heat-treated and, if necessary, heat-relaxed. Thereafter, a polymer for constituting a heat-sealing layer (C) is melt-extruded and laminated at 200°–300° C. onto the surface of the cushion layer (B) of the biaxially stretched two-layer film thus obtained. In this way there is obtained a laminated three-layer film falling under the scope of the present invention. Of importance is that the specific surface orientation degrees of the constituent layers as a characteristic feature of the invention are attained by combinations of the aforementioned extrusion temperatures, heating temperatures in stretching and stretch ratios of the layers. More specifically, the lower the extrusion temperature and the heating temperature in stretching, the higher the degree of surface orientation, and vice versa. Even when the extrusion temperature and the heating temperature in stretching are the same, the degree of surface orientation is low if the stretch ratio is low and it is high if the stretch ratio is high. Thus, the ranges of the surface orientation degrees defined in the present invention are obtained by combinations of such extrusion temperatures, heating tempratures in stretching and stretch ratios. The said ranges depend on polymers used for forming the base layer (A), cushion layer (B) and heat-sealing layer (C), as well as the melting points of the polymers. Then, if necessary, a known corona discharge treatment in the air or in nitrogen and/or carbon dioxide may be applied to the surface of the base layer (A) in the three-layer film thus obtained. This treatment is preferred for imparting an ink adhesive force to the base layer surface.

According to another example of a manufacturing method employable in the invention, a polypropylene for constituting a base layer (A) is fed to an extruder, while a polymer for constituting a cushion layer (B) is fed to another extruder, then both are conducted to a single die, from which they are co-extruded simultaneously in a melted state at 200°–300° C. and wound onto a cooling drum to obtain a two-layer sheet. Subsequently, the two-layer sheet is conducted into an oven with rools or a roll disposed therein, in which the sheet is heated to 100°-150° C. and stretched 3 to 7 times in the longitudinal direction. Further, a polymer for constituting a heat-sealing layer (C) is melt-extruded and laminated at 200°-300° C. from a still another extruder onto the surface of the cushion layer (B) in the thus longitudinally uniaxially oriented sheet to obtain a three-layer sheet. Then, the three-layer sheet is conducted into a tenter, in which it is heated to 150°-190° C. and stretched 5 to 15 times in the transverse (width) direction, then heat-treated and, if necessary, heat-relaxed to afford a laminated three-layer film according to the present invention. In this case, what is important is that the specific ranges of the surface orientation degrees of the constituent layers as a characteristic feature of the present invention are attained by combinations of the above melt-extrusion temperatures, heating temperatures in stretching and stretch ratios of the layers as in the foregoing first manufacturing example. Inevitably, such ranges depend on polymers used for forming the base layer (A), cushion layer (B) and heat-sealing layer (C) and their melting points. But the correlation between each temperature, stretch ratio and the degree of surface orientation obtained shows: the same tendency as in the first manufacturing example. Then, where required, the surface of the base layer (A) in the three-layer film is subjected to the foregoing corona discharge treatment.

The following methods were adopted for determining characteristic values and effects in the present invention.

(1) Degree of Surface Orientation

Using Laser Raman microscopy, a polarization-excited light is directed to each film layer and is received by a photomultiplier through an analyzer. Optical densities are measured at 810 cm$^{-1}$, 841 cm$^{-1}$ and 890 cm$^{-1}$, then the film is rotated 360° and a maximum value of optical density ratios, namely absorbance ratios $d_{841}/d_{890}$ and $d_{841}/d_{810}$, is determined as a degree of surface orientation. The said $d_{810}$, $d_{841}$ and $d_{890}$ represent absorvances at 810 cm$^{-1}$, 814 cm$^{-1}$ and 890 cm$^{-1}$ respectively.

(2) Heat-Seal Strength

Using a hot plate heat-sealer and sealing bars 30 cm long by 10 mm wide, heat sealing is performed under the conditions of 135° C., 1 kg/cm$^2$ pressure, 0.5 second, and a peel strength of the sealed portion is determined by means of Tensilon.

(3) Bag-Burst Preventing Property under Reduced Pressure

This test is a kind of a cushioning property determining method. Heat-sealing faces of film are lapped together and heat sealing is performed under the conditions of 135° C., 1.0 kg/cm$^2$ pressure, 0.5 second. Internal dimension of the resulting bag is set at 7 cm × 10 cm and 100 ml of air is sealed into the bag. Then, the bag is placed in a reduced pressure tester whose temperature has been controlled to 25° C., and is held under a vacuum of −350 mmHg for 5 minutes. The following evaluation is made in accordance with the number of burst bag out of ten such bags:

| Number of Burst Bag | Evaluation |
| --- | --- |
| 0 | ⊚ |
| 1~3 | ○ |
| 4~7 | △ |
| 8 or more | x |

(4) Sealability (Bubble Test)

This test is a kind of a cushioning property determining method. Bags which have been prepared in the same manner as in the above bag-burst preventing property test under reduced pressure are placed in a constant-temperature water bath maintained at 25° C. and are each held in a position of 15 cm from the water surface for 3 minutes. Each bag with no bubble is evaluated to be ⊚, each bag with bubble generated in 1 minute to shorter than 3 minutes is evaluated to be , and each bags with bubble generated within 1 minute is evaluated to be X.

The case where the above (3) and (4) are both good can be judged to be superior in cushioning property.

(5) Rigidity (F-5 Value)

A stress-strain curve is obtained according to a Tensilon method to find a stress at 5% strain. The case where this value is 3 kg/mm$^2$ or more is judged to be superior in both rigidity and handleability with little deformation caused by tension or external stress during processing.

(6) Hot Tack

Using a heat seal tester (a product of Toyo Tester Kogyo), the upper portion of film 15 mm wide by 300 mm long, then a load of 50 g is applied to the lower portion of the film, allowing the film to hang down in front of sealing bars. A portion of the film is folded in two, then inserted between the sealing bars and bonded (seal width: 25 mm) at a sealing temperature of 125° C. and a sealing pressure of 1 kg/cm$^2$ for 1 second. Just thereafter, the load drops freely. A peel length (mm) of the sealed portion at a certain peeling load is measured. A value of the peel length not larger than 5 mm is judged to be good, while a value of the peel length not smaller than 20 mm is judged to be bad.

(7) Atomic Ratio

Using ESCA 750 (a product of Shimazu Seisakusho, Ltd.) and MgK$_{\alpha1.2}$ as excitation X-ray, an ESCA of ls orbit for a treated surface of film is measured while a photoelectron escape angle is set at 90 degrees and a bond energy value of C$_{IS}$ main peak at 284.6 eV. Then, oxygen atoms/carbon atoms (O/C) and nitrogen atoms/carbon atoms (N/C) are calculated.

(8) Adhesive Force of Printing Ink

A printing ink for cellophane, "CC-ST" white, (a product of Toyo Ink Mfg. Co., Ltd.) is applied to the surface of a base layer (A) of film, using a metering bar No. 6. After drying, a peeling test is conducted using a cellophane adhesive tape (registered trademark: "Cellotape", a product of Nichiban Co., Ltd.). Then, a remaining ink area on the film is determined by image processing, and evaluation is made on the basis of the following criterion:

| Remaining Ink Area | Adhesion Index |
| --- | --- |
| 95% or more | 5 |
| 90% or more, but less than 95% | 4 |
| 75% or more, but less than 90% | 3 |
| 50% or more, but less then 75% | 2 |
| less then 50% | 1 |

The higher the adhesion index, the better the bonding force.

EXAMPLES

The following examples are given to further illustrate the present invention.

Example 1

An isotactic homopolypropylene (isotacticity: 97%, [$\eta$]:2.5) containing 0.1 wt % of stearic acid amide and 0.1 wt % of silica was fed as a raw material of a base layer (A) to one extruder and melted at 255° C., while an ethylene-propylene-butene copolymer (hereinafter referred to simply as "BPC", ethylene component: 3.5 wt %, butene component: 5 wt %, m.p. 138° C.) containing 0.3 wt % of oleic acid amide and 0.3 wt % of silica was fed as a raw material of a cushion layer (B) to another extruder and melted at 275° C. Both were co-extruded into sheet in a heat-melted state at 255° C. The sheet was wound round a cooling drum for cooling, then heated to 135° C. and stretched 4.6 times in the longitudinal direction to obtain a uniaxially stretched two-layer film. Subsequently, an ethylene-methyl methacrylate-maleic anhydride terpolymer (abbreviated to "EMMA", m.p. 100° C.) as a raw material of a heat-Sealing layer (C) was melt-extruded and laminated onto the surface of the cushion layer (B) of the two-layer film thus obtained. The resulting three-layer film was conducted to a tenter which had been heated to 165° C., in which it is stretched 9 times in the transverse direction and heat-relaxed 7.8% in the width direction at 160° C. Then, the surface of the base layer (A) was subjected to a corona discharge treatment in a mixed atmosphere of nitrogen and carbon dioxide to adjust the surface tension to 43 dyne/cm as measured by the surface tension measuring method of JIS-K-6768. Lastly, the film was taken up onto a winder. In this way there was obtained a laminated three-layer film consisting of the base layer (A) 18 $\mu$m thick, cushion layer (B) 3 $\mu$m thick and heat-sealing layer (C) 4 $\mu$m thick. The results of evaluation of the film are as shown in Table 1.

Example 2

The procedure of Example 1 was repeated except that the EMMA used as the starting material of the heat-sealing layer (C) was substituted by the BPC used for forming the cushion layer (B), that is, BPC was used for both layers (B) and (C). The results of evaluation of the resulting three-layer film are as shown in Table 1.

Example 3

A uniaxially stretched film of (A)/(B) was obtained in the same way as in Example 1 and it was then fed to a tenter, followed by the same procedure as in Example 1, to afford a laminated two-layer film of (A)/(B). The thickness of the base layer (A) was 18 $\mu$m and that of the cushion layer (B) was 3 $\mu$m. Then, using another extruder in an off-line, polypropylene (LS-712, a product of Showa Denko K.K.) was heat-melted at 280° C. and in this melted state it was extruded and laminated as a heat-sealing layer (C) having a thickness of 20 $\mu$m onto the surface of the cushion layer (B).

Comparative Example 1

The procedure of Example 1 was repeated except that the longitudinal and transverse stretch ratios were changed to 7.5X and 15.5X, respectively. The degree of surface orientation $P_A$ of the base layer (A) thus formed was larger than the upper limit defined in the present invention.

Comparative Example 2

The procedure of Example 1 was repeated except that the heating temperature in the longitudinal stretching and the transverse stretch ratio were changed to 95° C. and 14X, respectively. The degree of surface orientation $P_B$ of the cushion layer (B) thus formed was larger than the upper limit defined in the present invention.

Comparative Example 3

The procedure of Example 1 was repeated except that the heating temperature in the transverse stretching was changed to 200° C. The degree of surface orientation $P_C$ of the heat-sealing layer (C) thus formed was smaller than the lower limit defined in the present invention.

Comparative Example 4

The procedure of Example 2 was repeated except that the heating temperature and stretch ratio in the longitudinal stretching were changed to 160° C. and 2.5X, respectively, and those in the transverse stretching were changed to 200° C. and 4.5X, respectively. The degree of surface orientation $P_A$ of the base layer (A) thus formed was smaller than the lower limit specified in the invention.

Comparative Example 5

The procedure of Example 1 was repeated except that the cushion layer (B) was not provided.

Comparative Example 6

In Example 1, EMMA was used as the raw material of the cushion layer (B) to obtain a three-layer film wherein the degree of surface orientation of the cushion layer (B) and that of the heat-sealing layer (C) were the same ($P_B = P_C$). Other conditions were the same as in Example 1.

Comparative Example 7

The procedure of Example 1 was repeated except that the material melting temperature for the heat-sealing layer (C), the heating temperature in the tenter and the transverse stretch ratio were changed to 190° C., 145° C. and 10X, respectively. As a result, the degree of surface orientation $P_C$ of the heat-sealing layer (C) was too large, exceeding the upper limit specified in the invention.

The results of evaluation made in the above working and comparative examples are all shown in Table 1. Form the same table it is seen that the laminated three-layer films prepared in Examples 1, 2 and 3 according to the present invention wherein the three layers are restricted in the degree of surface orientation are superior in sealability under reduced pressure, difficult to burst when sealed as bag, exhibit a strong heat-sealing force and are also superior in rigidity, hot tack and printability.

On the other hand, in Comparative Example 1, printability is poor because the degree of surface orientation $P_A$ of the base layer (A) is too large. In Comparative Example 2, the film obtained is inferior in point of bag-burst preventing property under reduced pressure and sealability because of too large surface orientation degree $P_B$ of the cushion layer (B). In Comparative Example 3, the film obtained is inferior in point of hot tack because of too small orientation degree $P_C$ of the heat-sealing layer (C). In Comparative Example 4, the film obtained is inferior in rigidity because of too small surface orientation degree $P_A$ of the base layer (A). In Comparative Example 5, the film obtained is inferior in point of bag-burst preventing property under reduced pressure and sealability.

In Comparative Example 6, the film obtained is inferior in point of bag-burst preventing property under reduced pressure and sealability because although the cushion layer (B) is present the degree of surface orientation thereof is the same as that of the heat-sealing layer (C) and hence does not satisfy the condition of $P_B < P_C$.

Further, in Comparative Example 7, the heat-sealing force is weak because the degree of surface orientation $P_C$ of the heat-sealing layer (C) is too large.

TABLE 1

| | Polymer and Degree of Surface Orientation, P | | | | | | | | | | Surface Atomic Ratio of Layer (A) | | Adhesive Force of Printing Ink |
|---|---|---|---|---|---|---|---|---|---|---|---|---|---|---|
| | Base Layer (A) | | Cushion Layer (B) | | Heat-Sealing Layer (C) | | Heat-Sealing Force | B.B.P. | Seala- | Rigidity | Hot Tack | | | |
| No. | Polymer | $P_A$ | Polymer | $P_B$ | Polymer | $P_C$ | (g/cm) | Property | bility | (kg/mm²) | (mm) | O/C | N/C | |
| Ex.1 | PP | 12.5 | BPC | 2.5 | EMMA | 3.0 | 890 | ⊙ | ⊙ | 3.4 | 2.1 | 0.13 | 0.01 | 5 |
| Ex.2 | PP | 12.3 | BPC | 2.0 | BPC | 3.0 | 660 | ⊙ | ⊙ | 3.3 | 2.0 | 0.14 | 0.02 | 5 |
| Ex.3 | PP | 12.7 | BPC | 2.6 | PP | 2.5 | 815 | ⊙ | ⊙ | 3.1 | 1.6 | 0.13 | 0.01 | 5 |
| Com.Ex.1 | PP | 16.5 | BPC | 2.5 | EMMA | 3.0 | 880 | ⊙ | ⊙ | 3.7 | 2.2 | 0.08 | 0.004 | 5 |
| Com.Ex.2 | PP | 12.5 | BPC | 3.8 | EMMA | 3.0 | 715 | x | x | 3.5 | 2.2 | 0.10 | 0.01 | 5 |
| Com.Ex.3 | PP | 12.5 | BPC | 2.5 | EMMA | 1.8 | 770 | ⊙ | ⊙ | 3.6 | 26.0 | 0.11 | 0.01 | 5 |
| Com.Ex.4 | PP | 1.9 | BPC | 2.0 | BPC | 3.0 | 600 | ⊙ | ⊙ | 2.1 | 5.0 | 0.12 | 0.02 | 5 |
| Com.Ex.5 | PP | 12.5 | non | | EMMA | 3.0 | 705 | x | x | 3.6 | 4.5 | 0.11 | 0.01 | 5 |
| Com.Ex.6 | PP | 12.5 | EMMA | 3.0 | EMMA | 3.0 | 730 | Δ | Δ | 3.7 | 5.0 | 0.11 | 0.01 | 5 |
| Com.Ex.7 | PP | 12.5 | BPC | 2.5 | EMMA | 4.5 | 260 | ⊙ | ⊙ | 3.0 | 2.5 | 0.11 | 0.02 | 5 |

EFFECT OF THE INVENTION

The laminated three-layer film of the present invention is superior in all of bag-burst preventing property under reduced pressure, sealability, heat-sealability, hot tack, rigidity and printability because the degree of surface orientation of each constituent layer is within a specific range defined in the invention.

What is claimed is:

1. A laminated three-layer film comprising:
   a base layer (A) formed by a biaxially oriented film of a crystalline polypropylene;
   a cushion layer (B) formed by a film of an olefin polymer having a melting point lower than that of the base layer (A);
   and a heat-sealing layer (C) formed by a film of an olefin polymer;
   wherein said layers (A), (B) and (C) are laminated in the order of (A)/(B)/(C) and have surface orientation degrees falling under the following ranges:
   $2.0 \leq P_A \leq 15.0$
   $0 \leq P_B \leq 3.5$
   $2.0 \leq P_C \leq 4.0$
   where,
   $P_A$ represents the degrees of surface orientation of the base layer (A)
   $P_B$ represents the degree of surface orientation of the cushion layer (B), and
   $P_C$ represents the degree of surface orientation of the heat-sealing layer (C).

2. A laminated three-layer film as set forth in claim 1, wherein said crystalline polypropylene has a melting point of not lower than 155° C. and an intrinsic viscosity [η] of 1.5 to 2.5 dl/g.

3. A laminated three-layer film as set forth in claim 1, wherein said cushion layer (B) is formed by an olefin copolymer having a melting point of 80° to 155° C.

4. A laminated three-layer film as set forth in claim 1, wherein said cushion layer (B) has a thickness of 1 to 5 μm.

5. A laminated three-layer film as set forth in claim 1, wherein said heat-sealing layer (C) is formed by an olefin copolymer.

6. A laminated three-layer film as set forth in claim 1, wherein the olefin polymer which constitutes the cushion layer (B) and the olefin polymer which constitutes the heat-sealing layer (C) are of the same composition, and the degree of surface orientation of the cushion layer (B) is smaller than that of the heat-sealing layer (C).

7. A laminated three-layer film as set forth in claim 1, wherein as atomic ratios within 10 nm from the surface of said base layer (A), O/C and N/C ratios are in the ranges of 0.1 to 0.35 and 0.005 to 0.05, respectively.

8. The laminated three-layer film of claim 6, wherein the degree of surface orientation of the cushion layer (B) is smaller by at least 0.5 than that of the heat-sealing layer (C).

9. A laminated three-layer film as set forth in claim 1, wherein said cushion layer (B) is formed from one or more polymers selected from the group consisting of α-olefin homopolymer, α-olefin copolymer, which is a copolymer of two or more α-olefins, ethylene-vinyl acetate copolymer and ethylene-acryl monomer copolymer.

10. A laminated three-layer film as set forth in claim 1, wherein said heat-sealing layer (C) is formed from one or more polymers selected from the group consisting of ethylene-propylene copolymer, ethylene-propylene-butene copolymer, ethylene-butene copolymer, ethylene-acryl monomer copolymer, ethylene-maleic arthydride copolymer, terpolymers of these comonomers with maleic anhydride, and ethylene-vinyl acetate copolymer.

11. A laminated three-layer film as set forth in claim 1, wherein said cushion layer (B) is formed from one or more polymers selected from the group consisting of α-olefin homopolymer, α-olefin copolymer which is a copolymer of two or more α-olefins, ethylene-vinyl acetate copolymer and ethylene-acryl monomer copolymer and said heat-sealing layer (C) is formed from one or more polymers selected from the group consisting of ethylene-propylene copolymer, ethylene-propylene-butene copolymer, ethylene-butene copolymer, ethylene-acryl monomer copolymer, ethylene-maleic anhydride copolymer, terpolymers of these comonomers with maleic anhydride, and ethylene-vinyl acetate copolymer.

* * * * *

UNITED STATES PATENT AND TRADEMARK OFFICE
CERTIFICATE OF CORRECTION

PATENT NO. : 5,376,437
DATED : December 27, 1994
INVENTOR(S) : Kenichi Kawakami et al It is certified that error appears in the above-indentified patent and that said Letters Patent is hereby corrected as shown below:

In Column 3, line 21, please delete "comohomers" and substitute --comonomers--.

In Column 6, line 15, after "be" please insert --O--, also delete "bags" and substitute --bag--.
Column 9 and 10
In Table 1, under the column "Adhesive Force of Printing Ink" please delete the fourth entry and substitute --2--.

In Column 10, line 51, please delete "arthydride" and substitute --anhydride--.

Signed and Sealed this

Twenty-first Day of February, 1995

Attest:

BRUCE LEHMAN

*Attesting Officer*   *Commissioner of Patents and Trademarks*